(No Model.)
J. M. FARMER.
TIRE FOR VEHICLE WHEELS.
No. 588,562. Patented Aug. 24, 1897.
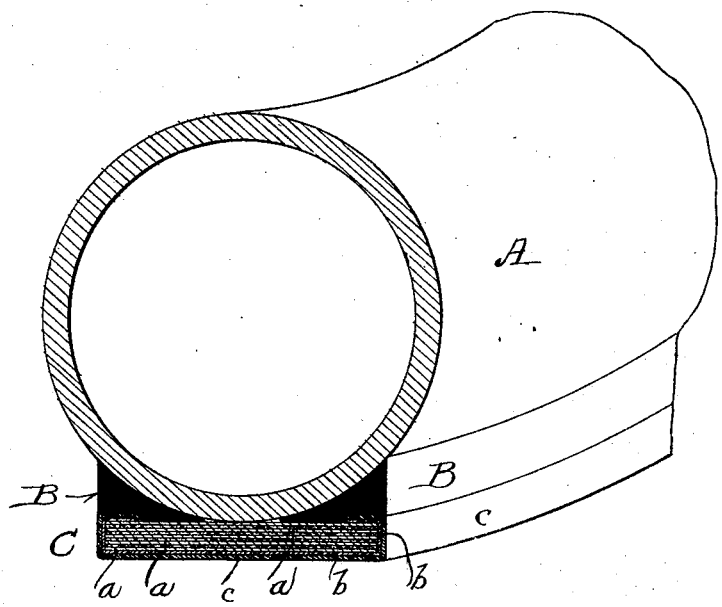
Witnesses:
Geo. N. Young,
B. C. Roloff.
Inventor:
Julius M. Farmer,
By H. G. Underwood
Attorneys

UNITED STATES PATENT OFFICE.

JULIUS M. FARMER, OF MILWAUKEE, WISCONSIN, ASSIGNOR, BY DIRECT AND MESNE ASSIGNMENTS, TO GUSTAV PODOLL, HENRY W. THEIS, CHARLES J. FOX, AND DELBERT H. MAY, OF SAME PLACE.

TIRE FOR VEHICLE-WHEELS.

SPECIFICATION forming part of Letters Patent No. 588,562, dated August 24, 1897.

Application filed March 10, 1897. Serial No. 626,713. (No model.)

*To all whom it may concern:*

Be it known that I, JULIUS M. FARMER, a citizen of the United States, and a resident of Milwaukee, in the county of Milwaukee and State of Wisconsin, have invented certain new and useful Improvements in Tires for Vehicle-Wheels; and I do hereby declare that the following is a full, clear, and exact description thereof.

My invention has especial reference to tires for bicycle-wheels, but is applicable to the wheels of other vehicles; and it consists in certain peculiarities of construction and combination of parts, as will be fully set forth hereinafter and subsequently claimed.

The drawing is a partly-perspective and partly-sectional view of a tire embodying my present invention.

Referring to the drawing, A represents a hollow or pneumatic tire-tube of any preferred construction. Strips of thin cloth $a\,a$ are coated upon one surface with ground emery or analogous granular material mixed with rubber solution, there being any desired number of these strips, five of said strips and four coatings being shown in the present illustration. A strip of fabric $b$ is arranged around the side and outer parts of the composite strips $a\,a$ described, with the side edges of said fabric brought over the inner layer $a$ of the coated cloth strips, as shown, and $c$ represents an outer layer of thin rubber which similarly surrounds the fabric $b$, the whole forming the tread C.

Strips of rubber B B serve to unite the tread C to the tube A and the parts are all vulcanized together.

In practice the tread C always maintains a substantially flat surface, and as it is practically incapable of puncture there is very little danger of injury to the pneumatic tube A. The said tube is attached in the ordinary way to any suitable wheel-rim, the method of attachment forming no part of my present invention.

Having thus described my invention, what I claim as new, and desire to secure by Letters Patent, is—

A tire for vehicle-wheels, consisting of a continuous hollow tube, with a continuous tread wholly exterior to said hollow tube, and composed of strips of thin cloth coated upon one surface with ground emery mixed with rubber solution, a strip of fabric arranged around the side and outer parts of the described composite strips, with the side edges of said fabric brought over the inner layer of the coated cloth strips, and an outer sheet of thin rubber similarly surrounding the said fabric, with the side edges of the said thin rubber sheet brought over the corresponding side edges of the said fabric, completing the said continuous tread, and solid continuous independent strips of rubber on each side of the hollow tube interposed between the same and the side edges of the tread, and all vulcanized together, substantially as set forth.

In testimony that I claim the foregoing I have hereunto set my hand, at Milwaukee, in the county of Milwaukee and State of Wisconsin, in the presence of two witnesses.

JULIUS M. FARMER.

Witnesses:
H. G. UNDERWOOD,
GUSTAV PODOLL.